Patented May 1, 1945

2,375,005

UNITED STATES PATENT OFFICE 2,375,005

PREPARATION OF ALPHA-BETA UNSATURATED NITRILES

Frederick E. Kung, Akron, Ohio, assignor to The B. F. Goodrich Company, New York, N. Y., a corporation of New York No Drawing. Application August 8, 1941, Serial No. 405,993

9 Claims. (Cl. 260—464)

This invention relates to the preparation of beta-hydroxy carboxylic acid amides from lactones of beta-hydroxy carboxylic acids and to the conversion of such amides into alpha-beta unsaturated carboxylic acid nitriles, particularly acrylic nitriles.

In a copending application Serial No. 393,671, filed May 15, 1941, an economical method of preparing lactones of beta-hydroxy carboxylic acids from the reaction of ketene with a carbonyl compound such as an aldehyde or ketone has been described. The ease with which such lactones are now obtained makes it desirable to use these compounds as starting materials for the synthesis of other compounds such as unsaturated acids, esters and nitriles, all of which are extremely useful as polymerizable materials in the production of synthetic rubber, synthetic resins and the like.

I have now discovered that beta lactones of monocarboxylic acids may be reacted with ammonia to prepare beta-hydroxy monocarboxylic acid amides which may then be converted into alpha-beta unsaturated carboxylic acid nitriles by dehydration. It is thus possible to prepare alpha-beta unsaturated nitriles from beta lactones. The reactions are believed to proceed substantially as indicated by the following equations.

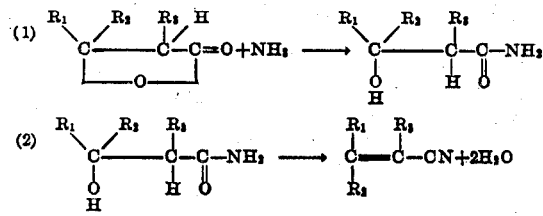

In the above formula R represents hydrogen, alkyl, aryl, aralkyl, or substituted alkyl, aryl or aralkyl radicals. Thus, the beta-lactone employed may be any lactone of a beta-hydroxy monocarboxylic acid which has at least one hydrogen on the alpha carbon atom, for example, beta-lactones of unsaturated aliphatic monocarboxylic acids such as hydracrylic acid lactone, beta-hydroxy butyric acid lactone, alpha-methyl hydracrylic acid lactone, beta-hydroxy n-valeric acid lactone, beta-hydroxy alpha-methyl butyric acid lactone, alpha-ethyl hydracrylic acid lactone, beta-hydroxy iso-valeric acid lactone, beta-hydroxy n-caproic acid lactone, beta-hydroxy alpha-methyl valeric acid lactone, beta-methyl beta-ethyl hydracrylic acid lactone, alpha-methyl beta-ethyl hydracrylic acid lactone, alpha-propyl hydracrylic acid lactone, alpha-butyl hydracrylic acid lactone or the like; beta-lactones of aryl or aralkyl substituted mono-carboxylic acids such as beta-phenyl hydracrylic acid lactone, alpha-phenyl hydracrylic acid lactone, beta-benzyl hydracrylic acid lactone, beta-cyclohexyl hydracrylic acid lactone or the like, and other substituted monocarboxylic acid beta-lactones such as beta-chloroethyl hydracrylic acid lactone or the like. The preferred compounds are the beta-lactones of saturated aliphatic monocarboxylic acids of a low molecule weight since these are easier to prepare and react more readily.

Examples of the practice of this invention include: the reaction of hydracrylic acid lactone with ammonia to form a hydracrylamide and the subsequent dehydration of hydracrylamide to acrylonitrile; the reaction of alpha-methyl hydracrylic acid lactone with ammonia to form alpha-methyl beta-hydroxy propionamide and its subsequent dehydration to methacrylonitrile; the reaction of beta-hydroxy butyric acid lactone with ammonia to form beta-hydroxy butyramide and its subsequent dehydration to crotonic acid nitrile; and many other examples of the preparation of beta-hydroxy amides and their dehydration to alpha-beta unsaturated nitriles.

Since beta-lactones, particularly low molecular weight beta-lactones, polymerize readily in presence of a small amount of an alkaline material, it is surprising that the reaction of ammonia with a beta-lactone yields an amide, for it would be expected that only polymeric material would be obtained. The reaction of the beta-lactone with ammonia may be carried out under a variety of conditions. For example, liquid ammonia may be treated with the beta-lactone or gaseous ammonia may be added to the lactone or a solution of the lactone in an inert organic solvent such as ether, dioxane, chloroform, carbon tetrachloride, ethylene chloride or the like. It is preferable, however, to employ liquid ammonia in excess quantities, so that the excess ammonia acts as a diluent or solvent, and to employ temperatures above the boiling point of liquid ammonia; hence it is advantageous to work in a closed vessel so that the reaction is carried out under pressure. Temperatures varying from room temperatures to about 100° C. or higher are preferred. The length of time necessary to complete the reaction varies from a few hours to as high as 16–20 hours.

The amides produced by the reaction of ammonia with a beta lactone may be isolated and purified in any convenient way, such as by distillation at reduced pressure. They are generally high boiling materials which give off ammonia when treated with an aqueous alkali. They are unstable at high temperatures, hence they should be distilled at reduced pressure.

Dehydration of the amides to alpha-beta unsaturated nitriles may be carried out by any of the known dehydration methods, such as by passing vapors of the amide over a heated dehydration catalyst such as aluminum oxide, barium oxide, zinc oxide, thorium oxide, zirconium oxide, titanium oxide, silica gel, aluminum phosphate or the like. In this case the temperature of dehydration is preferably from about 200 to 550° C. Either atmospheric or reduced pressures may be employed. The dehydration may also be effected by distilling the amide from phosphoric acid, sulfuric acid, benzene sulfonic acid or the like, but the vapor phase dehydration is preferred.

The following example will illustrate the practice of the invention but it is to be understood that the invention is not limited thereto for modifications in particular compounds and conditions employed will be apparent to those skilled in the art.

*Example*

72 g. of hydracrylic acid lactone were heated in an autoclave with 100 g. of anhydrous liquid ammonia to 100° C. for about 16 hours. After cooling, the excess ammonia was blown off and the reaction product distilled. 40 g. (50%) of a material distilling from 165 to 175° C. at a pressure of 4 millimeters of mercury, and residue were obtained.

Recrystallization of the volatile material yielded a crystalline solid having a melting point of 64°–66° C. This material was identified as hydracrylamide

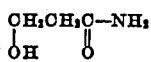

which is a new compound. Its analysis follows:

|  | Calculated | Found |
|---|---|---|
| Carbon | 40.50 | 40.42 |
| Hydrogen | 7.87 | 7.90 |
| Nitrogen | 15.75 | 15.66 |

The hydracrylamide prepared above was catalytically dehydrated in the vapor phase by passing the vaporized amide over alumina at 400° C. Acrylonitrile (B.P. 77–79° C.) was obtained in good yield.

I claim:

1. The method of preparing an amide of a beta-hydroxy monocarboxylic acid which comprises reacting a lactone of a beta-hydroxy monocarboxylic acid with ammonia.

2. The method of preparing an amide of a saturated aliphatic beta-hydroxy monocarboxylic acid which comprises reacting a lactone of a saturated aliphatic beta-hydroxy monocarboxylic acid with ammonia.

3. The method of preparing hydracrylamide which comprises reacting hydracrylic acid lactone with ammonia.

4. The method of preparing hydracrylamide which comprises reacting hydracrylic acid lactone with an excess of liquid ammonia at a temperature of about 100° C.

5. As a new chemical compound, hydracrylamide having the formula $$\underset{\underset{OH}{|}}{CH_2}\underset{}{CH_2}\underset{\underset{O}{\|}}{C}-NH_2$$

6. The method of preparing an alpha-beta unsaturated monocarboxylic acid nitrile which comprises reacting a lactone of a beta-hydroxy monocarboxylic acid, having at least one hydrogen atom on the alpha carbon atom, with ammonia to form an amide of a beta-hydroxy monocarboxylic acid, and subsequently dehydrating the amide to the nitrile.

7. The method of preparing an alpha-beta unsaturated aliphatic monocarboxylic acid nitrile which comprises reacting a lactone of an aliphatic beta-hydroxy monocarboxylic acid with ammonia to form an amide of an aliphatic beta-hydroxy monocarboxylic acid, and subsequently dehydrating the amide to the nitrile.

8. The method of preparing acrylonitrile which comprises reacting hydracrylic acid lactone with ammonia to form hydracrylamide, and subsequently dehydrating the hydracrylamide to acrylonitrile.

9. The method of preparing acrylonitrile which comprises reacting hydracrylic acid lactone with an excess of liquid ammonia at a temperature of about 100° C. to form hydracrylamide, and passing vapors of the hydracrylamide so formed over a dehydration catalyst at a temperature of about 400° C. whereby the hydracrylamide is dehydrated to form acrylonitrile.

FREDERICK E. KUNG.

Disclaimer

2,375,005.—*Frederick E. Kung*, Akron, Ohio. PREPARATION OF ALPHA-BETA UNSATURATED NITRILES. Patent dated May 1, 1945. Disclaimer filed Feb. 24, 1949, by the assignee, *The B. F. Goodrich Company*.

Hereby enters this disclaimer to claims 1 and 2.

[*Official Gazette March 29, 1949.*]